United States Patent [19]
Nakashima et al.

[11] Patent Number: 5,422,871
[45] Date of Patent: Jun. 6, 1995

[54] MEHTOD AND APPARATUS FOR PRODUCING AN OPTICAL DISK HAVING A READ-ONLY AREA AND A REWRITABLE AREA

[75] Inventors: Kazuo Nakashima; Kenichi Utsumi; Kazunori Naito, all of Kawasaki, Japan

[73] Assignee: Fujitsu Limited, Kawasaki, Japan

[21] Appl. No.: 121,640

[22] Filed: Sep. 16, 1993

[30] Foreign Application Priority Data

Mar. 15, 1993 [JP] Japan .................................. 5-053905

[51] Int. Cl.$^6$ .............................................. G11B 7/00
[52] U.S. Cl. .................................. 369/47; 369/48; 369/54; 369/58
[58] Field of Search ............... 369/47, 48, 49, 53, 369/54, 58, 59

[56] References Cited

U.S. PATENT DOCUMENTS 4,958,314  9/1990  Imai et al. ........................... 369/59 X
5,107,481  4/1992  Miki et al. ........................... 369/58 X

FOREIGN PATENT DOCUMENTS 4-001979  1/1992  Japan .
5-94673   4/1993  Japan .

Primary Examiner—Georgia Y. Epps
Assistant Examiner—Muhammad N. Edun
Attorney, Agent, or Firm—Staas & Halsey

[57] ABSTRACT

A method produces and an apparatus includes an optical disk, with a center, having a rewritable area and a read-only area located further out from the center than the rewritable area. The method includes the steps of and the apparatus includes units for registering first management information concerning a dummy file in a file address management area located further in toward the center than the rewritable area, the dummy file having a capacity corresponding to that of the rewritable area; registering second management information concerning files to be written into the read-only area in the file address management area so that the second management information is subsequent to the first management information and registering the files into the read-only area; and erasing the first management information from the file address management area.

8 Claims, 8 Drawing Sheets

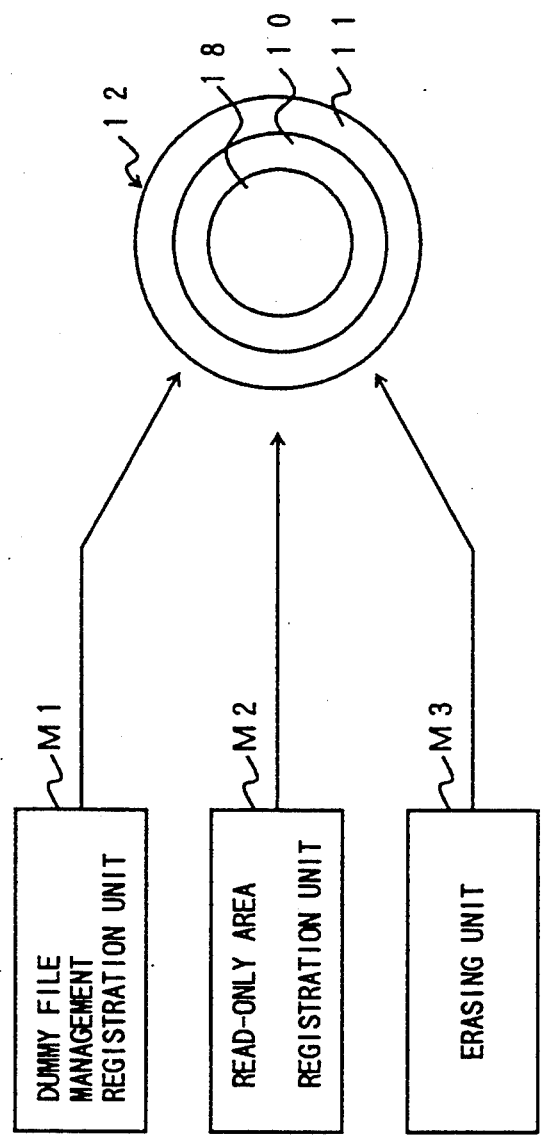

MEHTOD AND APPARATUS FOR PRODUCING AN OPTICAL DISK HAVING A READ-ONLY AREA AND A REWRITABLE AREA

BACKGROUND OF THE INVENTION

1. Background of the Invention

The present invention relates to a method for producing an optical disk, and more particularly to a method for producing an optical disk having a read-only area and a rewritable area.

2. Description of the Prior Art

An optical disk having a read-only area and a rewritable area is known. Such an optical disk is defined in, for example, the ISO standard. According to the ISO standard, a rewritable area is formed in an inner area of the optical disk, and a read-only area is formed in an outer area thereof. The rewritable area has a magneto-optic recording medium on which tracks are formed. The read-only area has pits formed on a recording medium.

Japanese Laid-Open Patent Application No. 2-101925 discloses an optical disk which has a file address management area formed in an innermost area of the optical disk. The file address management area includes information indicating directory tracks. A read-only area is formed further out than the file address management area, and a rewritable area is formed further out than the read-only area. The above optical disk is called a partially-read-only optical disk. A similar optical disk is also disclosed in Japanese Laid-Open Patent Application No. 4-1979.

Information is recorded on and read from the optical disk while the optical disk is being rotated at a constant angular velocity. In this case, the linear speed measured at an outer portion of the optical disk is greater than that measured at an inner portion thereof. Hence, a laser beam for recording information on the rewritable area needs a large amount of power because the rewritable area is rotated at a high velocity. Normally, the power of the laser beam used for recording is greater than that for reading. A tracking servo control of the rewritable area is carried out using grooves arranged in the circular direction of the optical disk. The linear velocity of the rewritable area formed in the outer area of the optical disk is great; hence, the response of the tracking servo control is low. This may cause tracking errors.

An optical disk in which the read-only area is further out than the rewritable area does not have the above-mentioned problems. In this case, the file address management area is formed further in than the rewritable area. According to general disk management operating systems, files are sequentially recorded on the optical disk from the inner area to the outer area. In other words, files are recorded on the optical disk from an idle recording area located further in than other idle recording areas. When information is written into the read-only area during the production process, it is necessary for the rewritable area to be filled with files. In the rewritable area, the addresses of files written into the rewritable area are registered from the innermost inner portion of the file address management area, and the addresses of files written into the rewritable area are registered so as to be subsequent to the addresses of files in the read-only area. If the rewritable area has unused portions, the address information concerning the read-only area cannot be registered in the file address management area.

SUMMARY OF THE INVENTION

It is a general object of the present invention to provide a method and apparatus for producing an optical disk in which the above disadvantage is eliminated.

A more specific object of the present invention is to provide a method and apparatus for producing an optical disk having an idle rewritable area and a read-only area in which files have been written.

The above objects of the present invention are achieved by a method for producing an optical disk having a rewritable area and a read-only area located further out than the rewritable area, the method comprising the steps of: (a) registering first management information concerning a dummy file in a file address management area located further in than the rewritable area, the dummy file having a capacity corresponding to that of the rewritable area; (b) registering second management information concerning files to be written into the read-only area in the file address management area so that the second management information is subsequent to the first management information and registering the files into the read-only area; and (c) erasing the first management information from the file address management area.

The above objects of the present invention are also achieved by an apparatus for producing an optical disk having a rewritable area and a read-only area located further out than the rewritable area, the apparatus comprising: first means for registering first management information concerning a dummy file in a file address management area located further in than the rewritable area, the dummy file having a capacity corresponding to that of the rewritable area; second means for registering second management information concerning files to be written into the read-only area in the file address management area so that the second management information is subsequent to the first management information and for registering the files into the read-only area; and third means for erasing the first management information from the file address management area.

BRIEF DESCRIPTION OF THE DRAWINGS

Other objects, features and advantages of the present invention will become more apparent from the following detailed description when read in conjunction with the accompanying drawings, in which:

FIG. 3 is a diagram of the principle of the present invention;

DESCRIPTION OF THE PREFERRED EMBODIMENTS

Figure 1A:
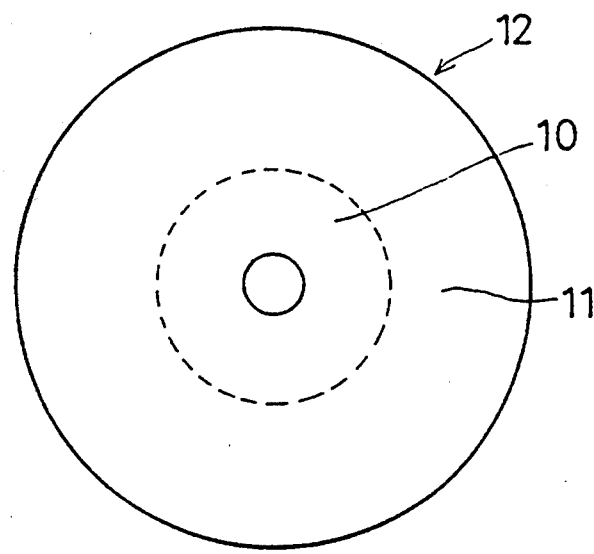
FIG. 1A is a plan view of an optical disk having a rewritable area located further in than a read-only area.
Figure 1B:
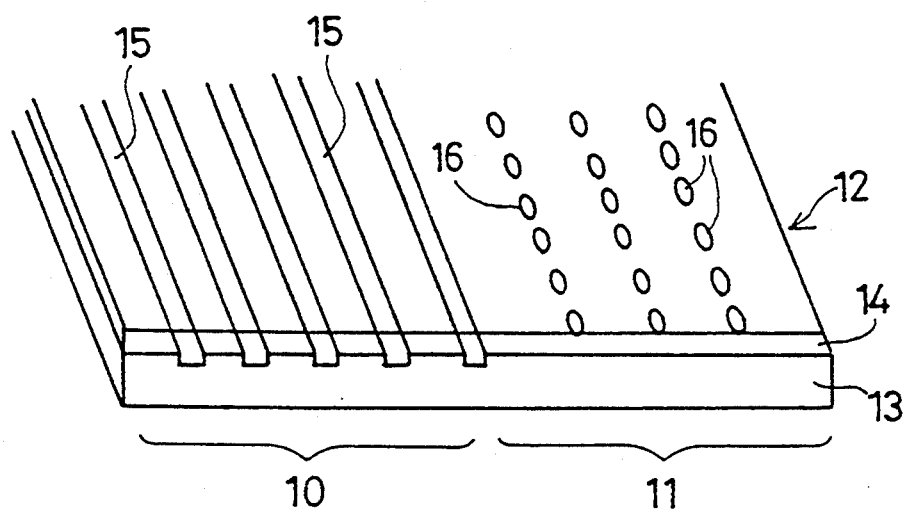
FIG. 1B is a perspective view of a part of the optical disk shown in FIG. 1A.

FIG. 1A is a plan view of a partially-read-only optical disk having a read-only area located further out than a rewritable area, and FIG. 1B is a perspective view of a part of the partially-read-only optical disk shown in FIG. 1A. The partially-read-only optical disk 12 shown in FIGS. 1A and 1B has a rewritable area 10 formed in an inner portion of the disk and a read-only area 11 formed in an outer portion thereof. As shown in FIG. 1B, the optical disk 12 has a base 13 on which a magnetizable film 14 is coated. Grooves 15 are formed in the circular direction on a surface portion of the magnetized film 14 within the rewritable area 10. Pits 16 are formed in the circular direction on a surface portion of the magnetized film 14 within the read-only area 11.

Figure 2A:
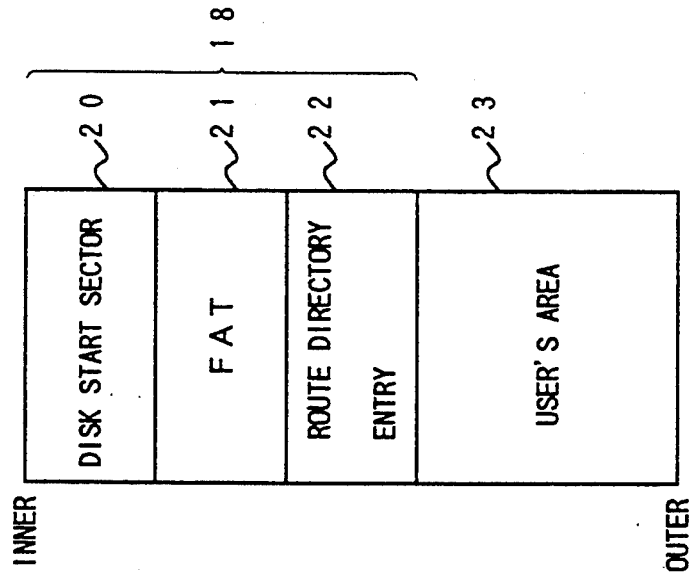
FIGS. 2A and 2B are diagrams of a format of the optical disk.

A disk format of the optical disk 12 is shown in FIG. 2A. A file address management area 18 is formed in an innermost area of the optical disk 12. The rewritable area 10 is formed further out than the file address management area 18, and the read-only area 11 is further out than the rewritable area 10. The management area 18 and the rewritable area 10 are rewritable areas.

When the above-mentioned partially-read-only optical disk is used, information is read therefrom in such a manner that the rewritable area 10 and the read-only area 11, physically separated from each other, are located in a logically identical section. In this manner, information can be read from the optical disk without recognizing whether the information is from the rewritable area 10 or the read-only area 11. It will be noted that information can be written into only the rewritable area 10. The file address management area 18 integrally manages the addresses of files written into the rewritable area 10 and the read-only area 11.

Figure 2B:
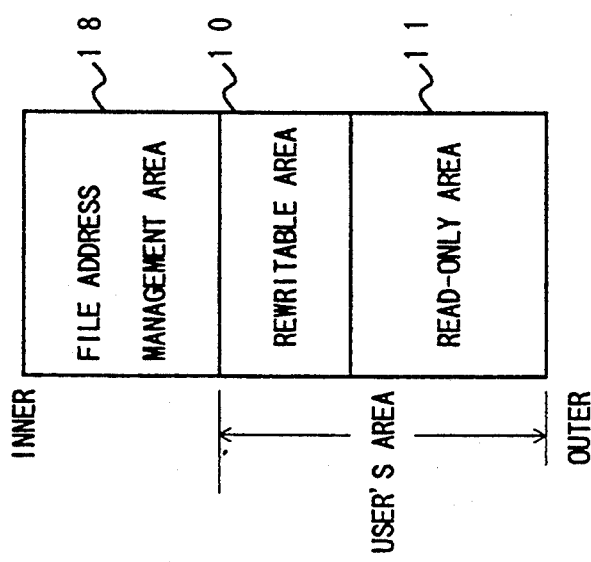

FIG. 2B shows a disk format of a general disk management operating system, which includes a disk starting sector area 20, a file allocation table (FAT) area 21, a root directory entry area 22, and a user's area 23, in this order, from the innermost side of the optical disk 12. The disk starting sector area 20 stores information necessary to start the operation system recorded on the optical disk 12. The FAT area 21 stores information concerning a cluster chain. The cluster chain means a chain of clusters. The cluster is a minimum recordable unit on the optical disk 12. Normally, one cluster consists of a few sectors formed on the optical disk 12. The cluster chain information indicates a cluster number and a subsequent cluster number. By tracing the cluster chain information, it is possible to identify the positions of files recorded on the optical disk 12. The root directory entry area 22 stores information indicating the file names of user's files and the starting cluster numbers of these files. The above areas 20, 21 and 22 correspond to the file address management area 18, and the user's area 23 corresponds to the rewritable area 10 and the read-only area 11.

When a file is read from the optical disk 12, the file name of that file and the starting cluster number thereof are read from the root directory entry area 22, and subsequently the cluster chain information recorded in the FAT area 21 is traced. In this manner, the position of the file to be read is identified, and the user's area 23 is accessed.

When a file is recorded on the optical disk 12, an unused cluster number, which is the minimum cluster number among the unused clusters is read from the FAT area 21, and data of the file is sequentially stored in the clusters in the increasing order of the cluster number from the minimum cluster number in order to efficiently use unused portions in the user's area. In this manner, data is sequentially recorded on the optical disk 12 from the inner side of the optical disk 12 without any unused area located further in than the current recording position.

Hence, it is necessary for the rewritable area 10 to be full of data when data is written into the read-only area during the production process. Conventionally, there is no efficient way to write data into the read-only area, and optical disks as shown in FIGS. 1A and 1B cannot be produced. The present invention is intended to provide an efficient method and apparatus for producing an optical disk having a read-only area having recorded files and a rewritable area which is virgin and located further in than the read-only area.

FIG. 3 is a diagram of the principle of the present invention. In FIG. 3, parts that are the same as those shown in the previously described figures are given the same reference numbers previously used. An optical disk producing apparatus shown in FIG. 3 includes a dummy file management information registration unit M1, a read-only-area registration unit M2, and an erasing unit M3. The dummy file management information registration unit M1 registers, in the file address management area 18 located further in than the user's area 23, management information concerning a dummy file written into the rewritable area 10. The read-only area registration unit M2 registers management information concerning files written into the read-only area 11 so as to be subsequent to the management information concerning the dummy file. Further, the read-only area registration unit M2 registers files in the read-only area 11. The erasing unit M3 erases the management information concerning the dummy file written into the rewritable area 10 from the file address management area 18.

According to the present invention, management information concerning a dummy file written into the rewritable area 10 is registered in the file address management area 18. Then, management information concerning the read-only area is written into the file address management area 18 so as to be subsequent to the management information concerning a dummy file, and files are written into the read-only area 11. Thereafter, the management information concerning the dumpy file written into the rewritable area 11 is erased from the file address management area 18. Hence, it becomes possible to produce an optical disk having a virgin rewritable area, and a read-only area in which files have been written.

Figure 4:
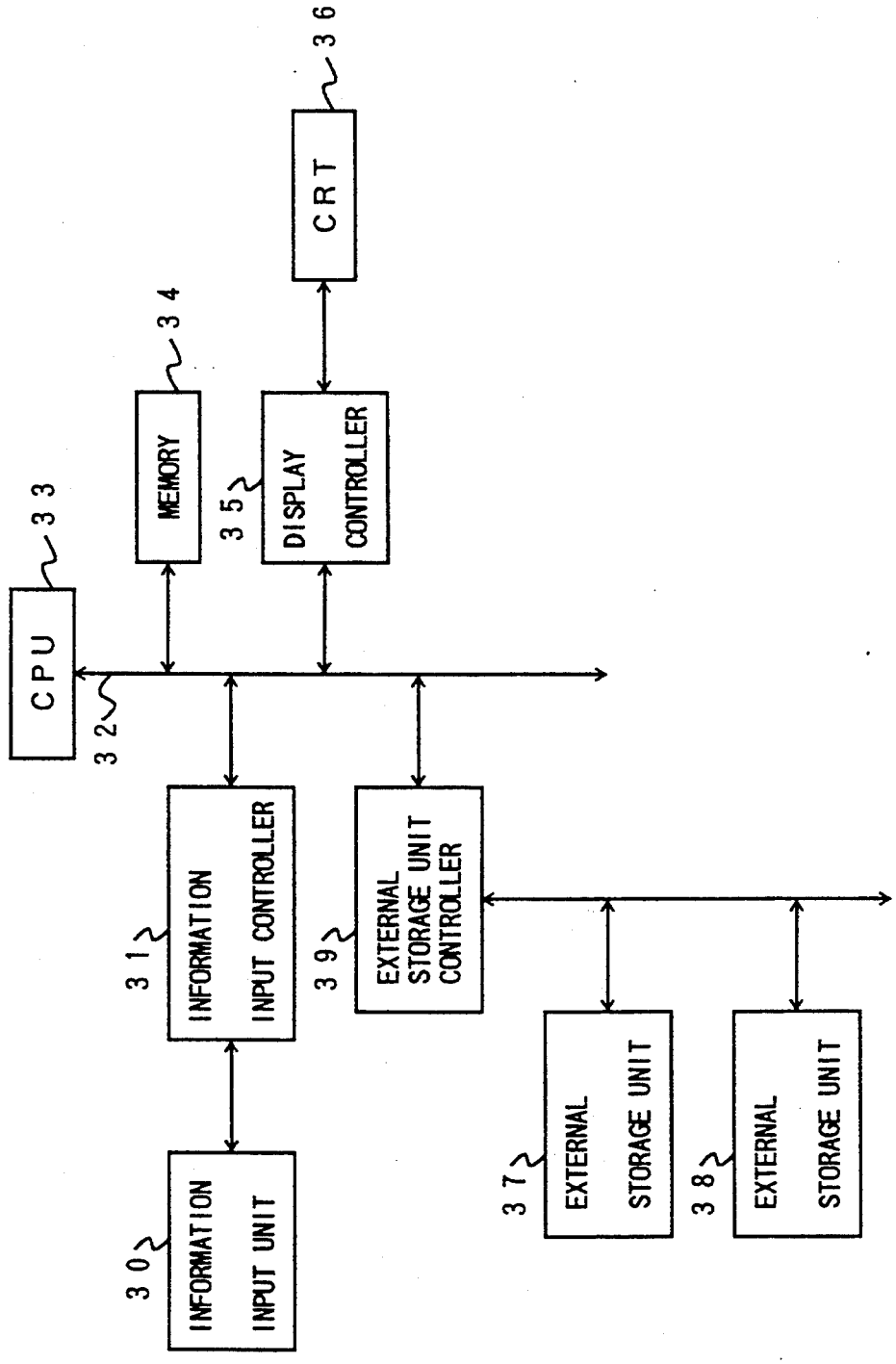
FIG. 4 is a block diagram of a file address information generating apparatus.

FIG. 4 is a block diagram of a part of an optical disk producing apparatus according to an embodiment of the present invention. The structure shown in FIG. 4 functions as a file address information generating device. An information input unit 30, such as a keyboard, is used to input a capacity of the read-only area 11 of optical disks to be produced and/or a capacity of the rewritable area 10 thereof. The input information is sent to a CPU 33 via an information input controller 31 and a bus 32, to which a memory 34, a display controller 35 and an external storage unit controller 39 are connected. The memory 34 is used to store programs executed by the CPU 33, and functions as a working memory of the CPU 33. The display controller 35 controls a display on a CRT 36. The controller 39 performs input/output control of external storage units 37 and 38, such as optical disk units. Files to be registered in the read-only area 11 are previously stored in the external storage unit 37 located on the file input side. Hereinafter, such files are referred to as ROM files. Original data is written onto a reference optical disk accommodated in the external storage unit 38 on the file output side.

Figure 5:
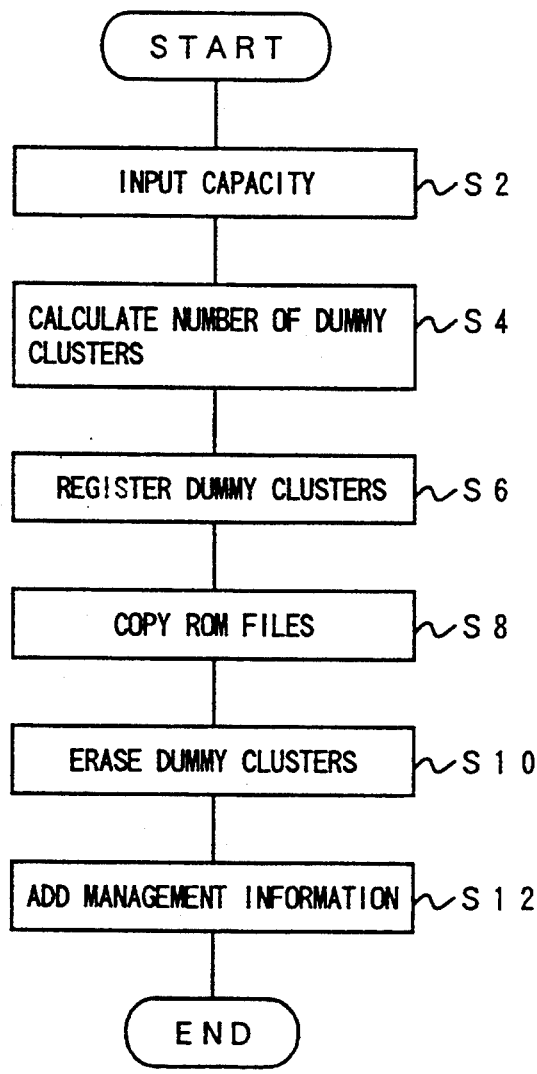
FIG. 5 is a flowchart of the operation of the apparatus shown in FIG. 4.

FIG. 5 is a flowchart of a process for generating the original data by means of the structure shown in FIG. 4. The original data is written onto the reference optical disk in the external storage unit 37. In step S2, information indicating the capacity of the read-only area 11 and/or the capacity of the rewritable area 10 is input by means of the information input unit 30. In step S4, the CPU 33 calculates the ending address of the rewritable area 10 and the starting address of the read-only area 11. Further, in step S4, the CPU 33 calculates the number of clusters related to the dummy file (dummy clusters), the above number of clusters corresponding to the capacity of the rewritable area 10. A layout of the optical disk obtained by the above calculation is displayed on the CRT 36. In step S6, the CPU 33 writes the number of dummy clusters calculated by step S4 onto the reference optical disk in the external storage device 38, starting from the starting (innermost side) position of the FAT area 21.

Figure 6:
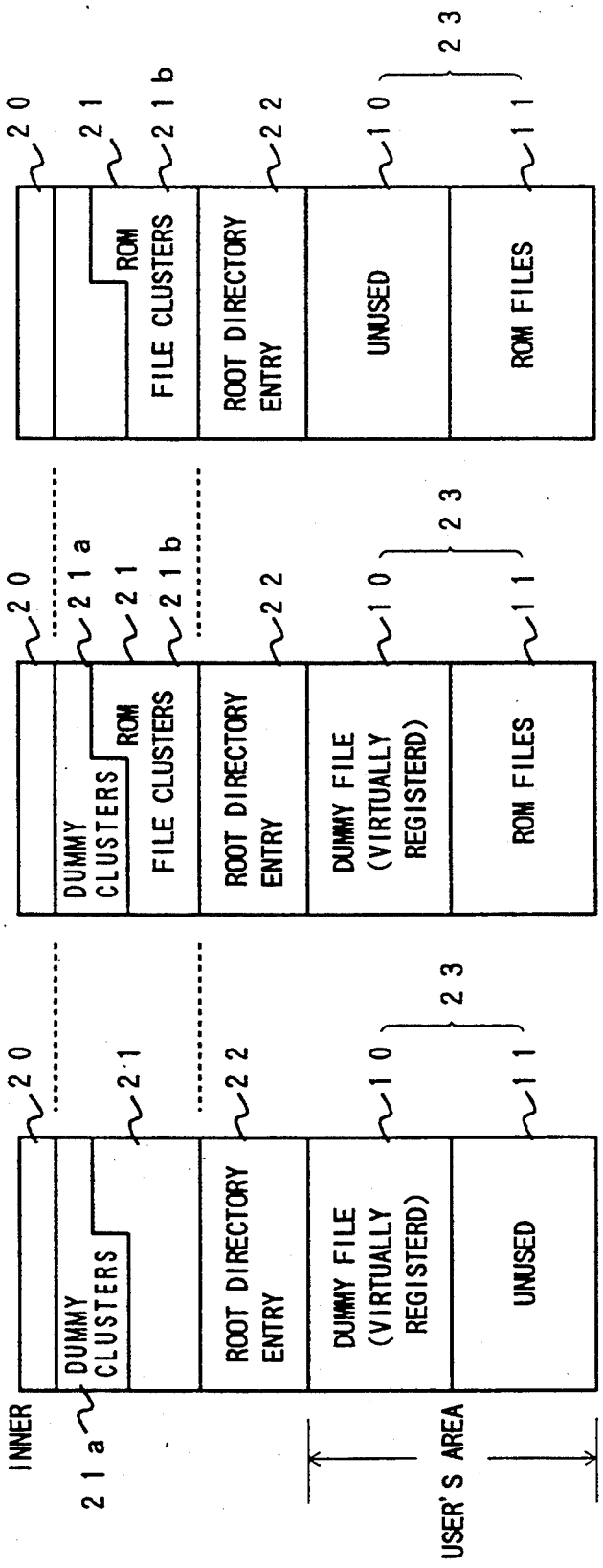
FIGS. 6A, 6B and 6C are diagrams of a format of the optical disk according to an embodiment of the present invention.

Now, the following will be assumed: 1) the cluster number ranges from $00_H$ to $FF_H$ (H denotes the hexadecimal notation), 2) cluster number $00_H$ denotes that the cluster is vacant, 3) cluster numbers $02_H$-$FF_H$ form a cluster chain, and 4) cluster number $01_H$ denotes a dummy cluster. As shown in FIG. 6A, cluster number $01_H$ is written into a dummy cluster area 21a in the FAT area 21 that has been initialized by means of cluster number $00_H$, and it is considered that a dummy file has been written into the rewritable area 10 of the user's area 23.

In step S8, the CPU 33 sequentially reads ROM files to be written into the read-only area 11 from the external storage unit 37, and copies the read ROM files onto the reference optical disk in the external storage unit 38. Hence, entry information concerning the ROM files written into the read-only area 11 is written into the root directory entry area 22. Further, as shown in FIG. 6B, a cluster chain area 21b of the ROM files written into the read-only area 11 is formed in the FAT area 21 so as to be subsequent to the dummy cluster area 21a, and the ROM files are written into the read-only area 11 so as to be subsequent to the dummy file written into the rewritable area 10 of the user's area 23.

In step S10, the CPU 33 instructs the external storage unit 38 to erase the dummy cluster area 21a from the FAT area 21. Hence, as shown in FIG. 6C, the dummy clusters assigned cluster number $01_H$ are changed to clusters assigned cluster number $00_H$, whereby the virgin rewritable area 10 can be formed in the user area 23. In step S12, information concerning the disk starting sector area 20, information concerning the ROM file cluster area 21b, and information concerning the root directory entry area 22 are added to the tail end of the read-only area 11.

Figure 7:
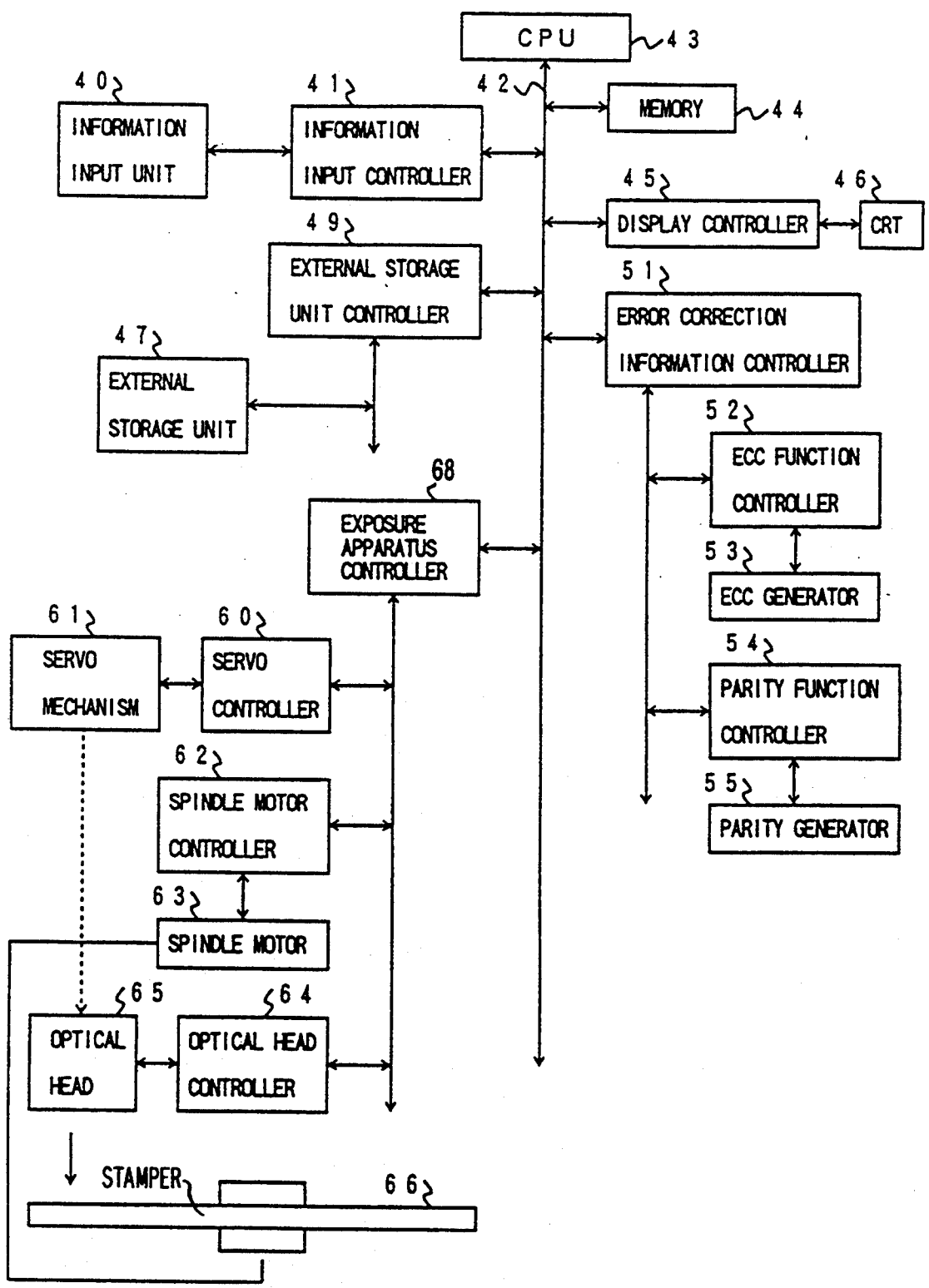
FIG. 7 is a block diagram of an original stamper producing apparatus according to the embodiment of the present invention.

FIG. 7 is a block diagram of an original stamper producing apparatus. An information input unit 40 such as a keyboard is connected to a bus 42 via an information input controller 41. A CPU 43, a memory 44, a display controller 45, an external storage unit controller 49, error correction information controller 51, and an exposure apparatus controller 52 are connected to the bus 42. The memory 44 stores programs to be executed by the CPU 43 and functions as a working memory of the CPU 43. The display controller 45 performs a display control of a CRT 46. The external storage unit controller 49 controls an input/output control of an external storage unit 47, such as an optical disk unit.

The reference optical disk onto which the original data has been written by means of the structure shown in FIG. 4 is inserted into the external storage unit 47.

An ECC (Error Correction Code) generator 53 is coupled to the error correction information controller 51 via a controller 52 with an ECC function added thereto. A parity generator 55 is coupled to the error correction information controller 51 via a controller 54 with a parity function added thereto. The ECC generator 53 generates an ECC code of 80 bytes with respect to one block (equal to 512 bytes) of ROM file data stored in the read-only area 11 with the management information added thereto and read from the external storage unit 47, and adds such an ECC code to the one block. The parity generator 54 generates a parity code of one block with respect to 25 blocks equal to one track, and adds such a parity code to the 25-block data.

A servo mechanism 61 is connected to the exposure apparatus controller 68 via a servo controller 60. A spindle motor 63 is connected to the exposure apparatus controller 68 via a spindle motor controller 62. An optical head 65 is connected to the exposure apparatus controller 68 via an optical head controller 64. The spindle motor 63 rotates an original stamper 66 at a constant velocity under the control of the controller 62. The servo mechanism 61 positions the optical head 65 at a desired position under the control of the controller 60. In this state, the optical head 65 writes the management information added ROM files with the ECC code and the parity code added thereto onto predetermined tracks (on the outer side of the disk) in the form of pits. A plurality of partially-read-only optical disks can be produced using the original stamper 66.

The formatting process is carried out at the commencement of use of the optical disk. The management information is read from the read-only area 11, and is written into the disk starting sector area 20, the ROM file cluster area 21b and the root directory entry area 22, these areas being formed in the rewritable area 10. Hence, the optical disk becomes usable.

As has been described above, according to the present invention, management information concerning the dummy file (dummy clusters) is registered in the rewritable area 10. Thereafter, management information concerning ROM files (ROM file clusters) written into the read-only area is registered and ROM files are written into the read-only area 11. Hence, it is possible to register the ROM files in the read-only area 11 so as to be subsequent to the dummy file in the rewritable area 10 and to provide the virgin rewritable area 10 because the management information (dummy clusters) concerning the dummy file written into the rewritable area 10 is erased.

Figure 8A:
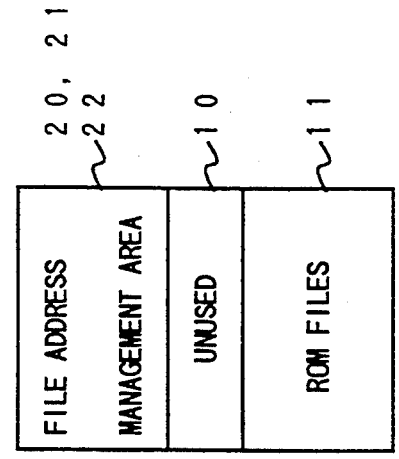
FIGS. 8A, 8B and 8C are diagrams of a format of the optical disk according to another embodiment of the present invention.
Figure 8B:
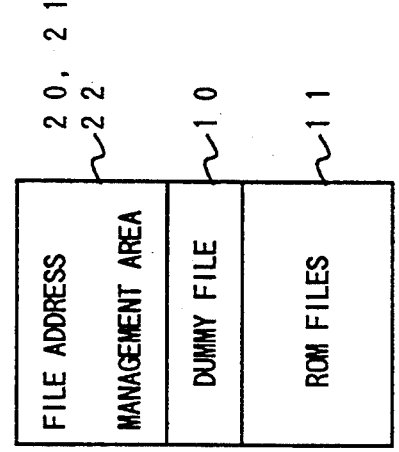
Figure 8C:
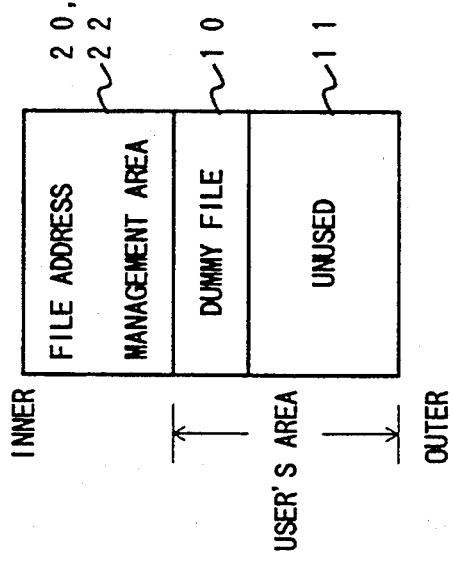

In the above-mentioned embodiment, only the dummy clusters are written onto the reference optical disk and the dummy file is not actually written into the rewritable area 10 of the user's area 23. However, it is also possible to employ a process as shown in FIGS. 8A through 8C. The dummy file is actually written into the rewritable area 10 as shown in FIG. 8A, and ROM files are written into the read-only area 11 so as to be subsequent to the dummy file as shown in FIG. 8B. Then, the management information concerning the dummy file is erased from the FAT area 21, as shown in FIG. 8C. However, it may take a long time to actually write the dummy file in the rewritable area 10.

The present invention is not limited to the specifically disclosed embodiments, and variations and modifications may be made without departing from the scope of the present invention.

What is claimed is:

1. A method for producing an optical disk with a center, having a rewritable area, with a capacity, and a read-only area located further out from the center than the rewritable area, said method comprising the steps of:
   (a) registering first management information concerning a dummy file in a file address management area located further in toward the center than the rewritable area, said dummy file having a capacity corresponding to the capacity of the rewritable area;
   (b) registering second management information, concerning files to be written into the read-only area, in the file address management area so that the second management information is subsequent to the first management information and registering the files into the read-only area; and
   (c) erasing the first management information from the file address management area.

2. The method as claimed in claim 1, wherein:
   said registering step (a) comprises the substep (a1) of registering, as the first management information, cluster information in the file address management area,
   said cluster information indicating whether said dummy file is present.

3. The method as claimed in claim 2, wherein said registering in step (a) further comprises the substeps of:
   (a2) calculating a number of clusters corresponding to the capacity of the rewritable area; and
   (a3) writing the cluster information in a part of the file address management area corresponding to the number of clusters calculated in the substep (a2).

4. The method as claimed in claim 1, wherein said registering in step (a) comprises the substep (a1) writing the dummy file into the rewritable area.

5. An apparatus for producing an optical disk with a center, having a rewritable area with a capacity and a read-only area located further out from the center than the rewritable area, said apparatus comprising:
   first means for registering first management information concerning a dummy file in a file address management area located further in toward the center than the rewritable area, said dummy file having a capacity corresponding to that of the rewritable area;
   second means for registering second management information concerning files to be written into the read-only area in the file address management area so that the second management information is subsequent to the first management information, and for registering the files into the read-only area; and
   third means for erasing the first management information from the file address management area.

6. The apparatus as claimed in claim 5, wherein:
   the first means further comprises fourth means for registering, as the first management information, cluster information in the file address management area; and
   said cluster information indicates whether said dummy file is present.

7. The apparatus as claimed in claim 6, wherein the first means further comprises:
   fifth means for calculating a number of clusters corresponding to the capacity of the rewritable area; and
   sixth means for writing the cluster information in a part of the file address management area corresponding to the number of clusters calculated by the fifth means.

8. The apparatus as claimed in claim 5, wherein the first means further comprises fourth means for writing the dummy file into the rewritable area.

* * * * *